United States Patent Office 3,699,047
Patented Oct. 17, 1972

3,699,047
COOLANT SYSTEM AND CORROSION INHIBITOR
AND METHOD OF USE
Ernest Q. Petrey, Jr., Randolph Township, N.J., assignor to Drew Chemical Corporation, New York, N.Y.
No Drawing. Filed May 13, 1970, Ser. No. 37,012
Int. Cl. C23f 11/10, 11/16
U.S. Cl. 252—175                                    14 Claims

ABSTRACT OF THE DISCLOSURE

A cooling system corrosion inhibitor which comprises a divalent metal ion, a chelating agent, and a modified lignosulfonate polymeric material, and the process of utilizing said corrosion inhibitor.

---

This application relates to methods of inhibiting corrosion and the deposition of scale in cooling systems, and to compositions for accomplishing the inhibition of corrosion and scale deposition in such system. More particularly, this application relates to methods of inhibiting corrosion and scale deposition without the use of chromates or dichromates or inorganic condensed phosphates in the coolant system. Such coolant systems comprise water, with or without the presence of another coolant such as ethylene glycol, in amounts of up to 15%.

It is known to the art that coolants and especially water, tend to corrode the metals used in heat exchange equipment and the related fittings. These metals include copper, steel, aluminum, and several alloys. Dissolved and suspended solids or other colloidal matter in the coolant forms deposits which cling to the above mentioned metal surfaces, in the form of scale or deposits, whereby the rate of heat transfer in the heat exchanger is reduced, the conduits being clogged and in general add to the corrosive aspect of the water, etc., used for cooling. The latter aspect is explained by the fact that a metal surface which is exposed to a corrosive environment, such as water which contains dissolved oxygen and dissolved ionic inorganic solids will be subjected to corrosion under the deposits of solids that form on the metal. This is known to the art as under deposit corrosion. By inhibiting deposition of scale, under deposit corrosion, is substantially prevented.

In the past, methods of inhibiting corrosion and scale deposition have often involved the use of chromates or dichromates dissolved in the cooling water, frequently in combination with inorganic condensed phosphates. Chromates and dichromates present in water in the form of inorganic ions are toxic to the fish and vegetable life found in the streams and rivers into which the cooling water is ultimately discharged after use, thus adding to the destruction of the environment. Furthermore, condensed phosphates often undergo chemical conversion to orthophosphates which can precipitate out as the calcium and/or aluminum orthophosphates, which salts detrimentally act to diminish the corrosion inhibiting characteristics of the anti-corrosion composition. It is also known that orthophosphates stimulate the growth of algae which can bring about noxious odors as well as diminished flow of the coolant due to the suspension of the algae therein.

It has now been found that a superior corrosion inhibitor composition can be prepared which does not contain any toxic pollutants such as chromate and phosphate ions and the other problems associated with the use of corrosion inhibitors containing same. This new composition not only is free from the disadvantages of the prior art, but also possess several advantages of its own.

It is known that chlorine or other biocides are added to coolant compositions to inhibit and kill microorganisms found therein. Whereas, in the prior art the addition of large excesses of chlorine etc., to combat the microorganisms detrimentally affected the anti-corrosion characteristics of certain added compositions by acting as an oxidizing agent for the polymeric component. The polymeric materials utilized herein are substantially less susceptible to chlorine oxidation to a non-functional form.

Certain polymeric components of the prior art are known to leave a brownish stain or film on the metal components of the cooling apparatus, which though removeable, requires the exercise of much effort. This is caused by the inherent chemical nature of certain polymeric materials, such as the leucocyanidin-catechin polymers, which are present in several compositions now available in the market place.

It is also known that certain polymeric components can only be utilized with certain classes of sequestrants. The polymeric components utilized herein can be used in combinations with the amines such as ethylene diamine tetraacetic acid, the sugar acid chelants, such as sodium heptagluconate, etc., as described in U.S. Pat. 3,256,203, issued to Robertson et al., and with amino tri-(lower alkylidene phosphonic acids), or their salt, as described in U.S. Pat. 3,234,124, issued to Irani.

Accordingly, it is an object of this invention to provide a cooling water inhibition composition that is free from chromate and dichromate ions.

It is another object of this invention to prepare a coolant composition which inhibits corrosion and does not contain phosphate ions in any form, and is free from the problems associated therewith.

It is a further object to prepare a coolant anti-corrosion composition which requires the usage of a lesser amount of chlorine to be used in conjunction with the composition for microorganism control.

A still further object is to provide a cooling agent corrosion inhibitor composition that does not deposit brown stain on the heat exchanger elements, and which can be prepared with any of several classes of chelating agents.

A yet further object is to provide a method for lessening the corrosive effect of coolant compositions on the heat exchangers.

One further method is to provide a process for inhibiting corrosion and scale deposition caused by coolant compositions.

Still another object is to provide a composition which not only acts as an anti-corrosion composition, but one which also serves to inhibit scale deposition in coolant systems.

Other objects will in part be obvious and will in part appear hereinafter.

The invention accordingly comprises the several steps and the relation and order of one or more of such steps with respect to each of the others and to the compositions possessing the features, properties and relation of elements which are exemplified in the following detailed disclosure and the scope of which will be indicated in the appended claims.

For a fuller undestanding of the nature and objects of the invention, reference should be made to the following detailed description.

The novel compositions of this invention comprises three (3) key ingredients; namely, a polymeric material, a divalent metal ion, and chelant.

In short, the divalent metal ion is selected from among zinc, cadmium and mixtures thereof.

The chelant is chosen from among several groups of compounds, namely (a) alkylphosphonic acids and the salts thereof; (b) polycarboxylic acid-type compounds such as ethylene diamine tetraacetic acid (hereinafter E.D.T.A.), nitrilotriacetic, (hereinafter N.T.A.) and hydroxyethyl tetraacetic acid (hereinafter H.E.T.A.). Other hydroxyalkyltetraacetic acids are also suitable for use herein, as well as the sodium potassium and ammonium salts thereof. A third group of chelants utilizable herein (c) are the weak chelating agents of the Robertson patent mention above, including sodium heptagluconate.

The polymeric materials have been carefully chosen such as to avoid the problems of the prior art, but yet still contribute to effective corrosion inhibition as well as to the prevention of scale deposition.

The two preferred polymeric materials utilized interchangeably herein are modified lignosulfonates which are marketed by Marathon Chemical Company under the name Chelig 32, and product marketed by the Rayonier Company under the name LS 350. Separately or together they are used in a concentration in a range of from about 0.5 to about 100 p.p.m. in the coolant system, based on the weight of coolant. This material is generally present in the composition in an amount from about 15% to about 90% of the composition.

More particularly, the divalent zinc and/or cadmium ions can be derived from any water soluble salt suitable, including sulphate, halides, nitrate, etc., for the nature of the cooling system's hardware. Thus, if aluminum components are present, the chlorides and fluorides of zinc and cadmium should be avoided. The concentration of metal ion should be at least two (2) parts per million by weight of coolant, and preferably at least five (5) p.p.m. Little operational advantage is obtained by utilizing in excess of fifty (50) p.p.m. of metal ion. The divalent metal ion generally is present in the composition in an amount from about 1% to about 10%.

The third constituent of the composition is selected from among the several groups of compounds enumerated above. The first of these groups is the class of alkyl phosphonic acids which includes the amino tri-(alkyl-phosphonic) acids having the formula, $[(OH)_2OP-R-]_3 \equiv N$, or alternatively, the formula $N \equiv (-R-H_2PO_3)_3$, wherein $-R-$ is a lower alkylene radical having from one to four carbon atoms, e.g., $-CH_2-$, $-C_2H_4-$, etc. These compounds are referred to in U.S. Pat. No. 3,234,124. Amino tri-(methylphosphonic) acid is commercially available from the Monsanto Chemical Company under the trade name Dequest 2000. Salts derived from monovalent cations (e.g., sodium, potassium and ammonium ions) of such acids may also be used. The sodium salt of amino tri(methylphosphonic) acid is market under the name Dequest 2006, and is utilizable for this invention. Other phosphonic acids such as 1-hydroxyethylidene 1, 1-diphosphonic acid (known as H.E.P.D.) can also be used.

The second group, the sugar acid chelating agents, reference is made to the above mentioned Robertson et al patent and specifically to sodium heptagluconate, as indicated above, the polycarboxylic acid chelants such as E.D.T.A. and the others set forth can also be utilized for this invention.

Regardless of which chelating agent is employed, the amount of same to be incorporated into the cooling system is in the range of about 0.1 to about twenty-five (25) p.p.m. based on the weight of coolant. The chelating agent is generally present in the composition in an amount from about 0.5% to about 25%.

It is to be understood that the compositions of the instant invention may be added directly to the cooling system, or alternatively each component can be added separately to the coolant such that the compositions are prepared in the coolant.

EXAMPLE I

The powder type dry compositions were prepared by mixing, according to the proportions set forth in Table I, the chelating agent, the polymeric material and the metallic salt, in a suitable vessel designed for the production of dry blended products. The mixing was carried out at room temperatures until a homogeneous mixture was obtained.

A typical mixing apparatus would be a Patterson Kelly Twin Shell V-type blender. The three ingredients can be added in any order to the vessel.

EXAMPLE II

The liquid format products are prepared as follows, in the proportions set forth in Table II below. In a low shear mixing apparatus was added the requisite amount of water. While distilled water is preferred, tap water may be utilized, unless an exceedingly high amount of a deleterious ion is present therein. The dry ingredients are blended in, in any order with agitation until a uniform mixture having a viscosity substantially similar to that of water is obtained, at which time agitation is terminated. The composition is deemed ready for use at this point.

The choice of the physical form of the compositions of this invention to be utilized is dependent on the convenience of the feeding method utilized. Thus, liquid format compositions are deemed best for continuous feed systems, as well as for small size as is known in the art, noncontinuous feed systems.

I

| | Percent |
|---|---|
| EDTA·4 Na | 2.50 |
| Zinc chloride | 12.00 |
| Chelig 32 | 20.00 |
| Water | 65.50 |
| Total | 100.00 |

II

| | Percent |
|---|---|
| NTA·3 Na | 2.20 |
| Zinc chloride | 11.00 |
| LS 350 | 20.00 |
| Water | 66.80 |
| Total | 100.00 |

III

| | Percent |
|---|---|
| Sodium heptagluconate | 35.20 |
| Cadmium iodide | 5.30 |
| LS 350 | 7.10 |
| Water | 82.40 |
| Total | 100.00 |

IV

| | Percent |
|---|---|
| Dequest 2006 | 5.70 |
| Zinc sulfate·$H_2O$ | 17.00 |
| Chelig 32 | 26.30 |
| Water | 51.00 |
| Total | 100.00 |

V

| | Percent |
|---|---|
| A. EDTA·4 Na | 5.00 |
| B. Zinc sulfate·$H_2O$ | 21.00 |
| C. Chelig 32 | 74.00 |
| Total | 100.00 |

VI

| | Percent |
|---|---|
| A. Dequest 2006 | 16.00 |
| B. Cadmium iodide | 8.00 |
| C. LS 350 | 76.00 |
| Total | 100.00 |

VII

| | Percent |
|---|---|
| A. NTA·3 Na | 4.80 |
| B. Cadmium iodide | 7.60 |
| C. Chelig 32 | 87.60 |
| Total | 100.00 |

VIII

| | Percent |
|---|---|
| A. Dequest 2006 | 9.00 |
| B. Zinc Chloride | 17.00 |
| C. LS 350 | 74.00 |
| Total | 100.00 |

IX

| | Percent |
|---|---|
| A. Sodium heptagluconate | 6.20 |
| B. Zinc sulfate·$H_2O$ | 13.40 |
| C. Chelig 32 | 80.40 |
| Total | 100.00 |

X

| | Percent |
|---|---|
| A. Dequest 2006 | 9.00 |
| B. Zinc chloride | 10.20 |
| Cadmium iodide | 6.80 |
| C. LS 350 | 74.00 |
| Total | 100.00 |

XI

| | Percent |
|---|---|
| A. E.D.T.A. | 5.00 |
| B. $ZnSO_4·H_2O$ | 35.00 |
| C. Chelig 32 | 60.00 |
| Total | 100.00 |

As is known to the art, the products Chelig 32 and LS 350 are lignin derivatives. It is critical in this invention to employ not just any lignin derivative but one such as Chelig 32 or LS 350 which has been treated to minimize the wood sugar content, or with is a member of the class of sodium lignosulfonate mixed sugar aldonates, or the corresponding potassium or ammonium salt, as well as the free acid derivative of the above in order to obtain results of the nature desired. Other lignins such as Indulin W-1, a lignin tertiary amine, and Palcotan, a derivative of red wood bark, when incorporated into coolant corrosion inhibition compositions gave rise to inferior results. The inventor is not able to explain why these inferior results were obtained, but is merely setting forth his findings.

Just as it is important to exclude chloride and fluoride ion if any the coolant system's components are made of aluminum, so to, it is known to be advantageous when the system contains copper or copper alloys in the tubing, piping valves, etc., to include a corrosion inhibitor known to be specifically effective to inhibit corrosion on copper and copper alloy surfaces, such as diethyldithiourea, mercaptobenzothiazole, and benzotriazole among others, in the range of 0.05 to 0.5 part by weight based on the total composition weight.

These compositions when used in a fully aqueous, or $H_2O$-ethylene glycol cooling system should be utilized preferably in the range of from 10 p.p.m. to about 300 p.p.m. of coolant. Lesser amounts than 10 p.p.m. may have only limited effectiveness, while no benefit is derived from using greater amounts than 300 p.p.m. of product is deemed wasteful.

The following non-limiting examples illustrate the preparation of typical compositions for use in cooling systems, utilizing water at least in part as the coolant. Some of these are in the solid particulated state, others of which are in a liquid state. All percentages are by weight, unless otherwise indicated.

In order to demonstrate the effectiveness of these compositions as a corrosion inhibiting composition, and to demonstrate their superiority over other known corrosion inhibiting compositions for aqueous coolant systems, tests were run utilizing a predetermined amount of standard hard water into which was placed a predetermined amount of a particular corrosion inhibitor.

Each of these water solutions was used in a standard corrosion test with alcohol cleaned, air dryed, mild steel coupons (A.S.T.M. 1010) in a bath in which the coupons were circulated at a rate to give a water velocity past the coupon of one foot per second. The coupons were one half inch (½) by two (2) inches by one sixteenth (1/16) inch. The temperature of the bath was 140° F., at a pH of 7.5–8.0. The corrosion of each coupon is given below in terms of milligrams of weight loss.

Standard "hard water" #I, was prepared, of the following content:

| | P.p.m. |
|---|---|
| Chloride ion | 500 |
| Sulfate ion | 500 |
| Copper ion | 0.2 |
| Ferrous ion | 0.5 | and expressed as calcium carbonate equivalents,

| | P.p.m. |
|---|---|
| Calcium | 300 |
| Magnesium | 100 |
| Methyl orange alkalinity | 20 | with the total amount of dissolved solids being 1646 p.p.m. Six prior art corrosion inhibitor compositions were prepared and evaluated according to the method set forth above.

Three of the compositions contained as the metal ion, 60 parts of cadmium iodide, and 54 parts of Rayflo-C, a leucocyanidin-catechin polymer and as the third component a chelant, present in twenty (20) parts. Sample I contained ethylene diamine tetraacetic acid; Sample II, Dequest 2000, an aminotri-(methylphosphonic) acid; and Sample III, a sugar acid salt, sodium heptagluconate.

PRIOR ART (1-6)

| Sample | Formulation | 1 day Wt. loss (g.) | 1 day Corro. rate, M.P.Y. | 3 day Wt. loss (g.) | 3 day Corro. rate, M.P.Y. | 7 day Wt. loss (g.) | 7 day Corro. rate, M.P.Y. | 2 day differential Wt. loss (g.) | 2 day differential Corro. rate, M.P.Y. | 4 day differential Wt. loss (g.) | 4 day differential Corro. rate, M.P.Y. | 6 day differential Wt. loss (g.) | 6 day differential Corro. rate, M.P.Y. |
|---|---|---|---|---|---|---|---|---|---|---|---|---|---|
| P.A. I | Rayflo-C, EDTA, $CdI_2$ | .0126 | 10.54 | .0434 | 12.13 | .0504 | 7.59 | .0308 | 12.90 | .0070 | 1.47 | .0378 | 5.30 |
| P.A. II | Rayflo-C, Dequest 2000, $CdI_2$ | .0043 | 3.56 | .0091 | 2.51 | .0126 | 1.51 | .0048 | 2.02 | .0035 | 0.75 | .0038 | 1.15 |
| P.A. III | Rayflo-C, Na Hepta, $CdI_2$ | .0064 | 5.37 | .0111 | 3.10 | .0400 | 4.68 | .0045 | 1.89 | .0289 | 6.10 | .0336 | 4.70 |
| P.A. IV | Rayflo-C, EDTA, $ZnSO_4·H_2O$ | .0077 | 6.5 | .0258 | 7.2 | .0421 | 5.1 | .0181 | 7.6 | .0163 | 3.4 | .0334 | 4.7 |
| P.A. V | Rayflo-C, Dequest 2000, $ZnSO_4·H_2O$ | .0013 | 1.1 | .0035 | 0.99 | .0152 | 1.8 | .0042 | 1.75 | .0139 | 2.9 | .0097 | 1.4 |
| P.A. VI | Rayflo-C, Na Hepta, $ZnSO_4·H_2O$ | .0022 | 1.9 | .0174 | 4.9 | .1024 | 12.3 | .0076 | 3.2 | .0850 | 17.9 | .1002 | 14.1 |

Three others (these were designated as IV, V and VI) of the compositions contained as the metal ion, 60 parts $Zn SO_4·H_2O$, as the third third component a chelant, present in twenty (20) parts. Sample IV contained ethylene diamine tetraacetic acid; Sample V, Dequest 2000, an amino-tri-(methylphosphonic) acid; and Sample VI, a sugar acid salt, sodium heptagluconate.

Samples of some of the compositions prepared as in Example I and II and designated compositions I to XI were utilized in a similar test environment and the data was obtained of the nature indicated just above with respect to the prior art compositions.

trial Water Engineering, volume 2, pages 18–19, 24 (June 1965) according to the method therein described. The steel heating surfaces had skin temperatures of about 322° F. The water flow rate was about two (2) feet per second past the metal surface.

The type of water used for these tests was standard "hard water" #II containing 1500 p.p.m. of chloride ions, 1500 p.p.m. of sulfate ions, 0.6 p.p.m. of copper,

THE INVENTION

| Composition number from Tables I and II | 1 day Wt. loss | 1 day Corro. rate | 3 day Wt. loss | 3 day Corro. rate | 7 day Wt. loss | 7 day Corro. rate | 2 day differential Wt. loss | 2 day differential Corro. rate | 4 day differential Wt. loss | 4 day differential Corro. rate | 6 day differential Wt. loss | 6 day differential Corro. rate |
|---|---|---|---|---|---|---|---|---|---|---|---|---|
| IV | .0012 | 1.00 | .0036 | 1.00 | .0068 | 0.82 | .0024 | 1.00 | .0032 | 0.67 | .0056 | 0.79 |
| IX | .0009 | 0.76 | .0022 | 0.61 | .0030 | 0.36 | .0013 | 0.55 | .0008 | 0.17 | .0021 | 0.29 |
| I | .0009 | 0.76 | .0042 | 1.18 | .0050 | 0.60 | .0033 | 1.39 | .0008 | 0.17 | .0041 | 0.58 |
| VI | .0025 | 2.10 | .0033 | 0.93 | ¹.0000 | 0.00 | .0008 | 0.33 | .0000 | 0.00 | .0000 | 0.00 |
| III | .0025 | 2.10 | .0065 | .177 | .0107 | 1.29 | .0040 | 1.67 | .0042 | 0.88 | .0082 | 1.15 |

¹ Weight gain recorded.

The weight losses are expressed absolutely in grams, while the corrosion rates are stated in mils per year of weight loss. Data was obtained after one (1) day, three (3) days, and seven (7) days total elapsed times, and the differences were calculated between the first (1st)– third (3rd); third (3rd)– seventh (7th); and first (1st)– seventh (7th) day periods both as to actual losses of weight and the rate of corrosion.

An analysis of the data obtained indicated that the compositions of the instant invention in all cases are superior corrosion inhibitors. This is attributed to the fact that the one (1), three (3) and seven (7) day corrosion rates of the compositions of prior art 1–6, in comparison with the five (5) representative compositions of the instant invention are higher. Similar reduction in corrosion rates will be obtained for other compositions within the scope of this invention which compositions utilize a polymeric material of the nature set forth.

In order to determine the relative toxicity of representative compositions within the scope of this invention a typical one was submitted to an independent testing laboratory for the conductance of toxicity studies.

White rats of uniform weight, after twelve (12) hours of fasting received orally, the test material at various dose levels. All animals were observed carefully for toxic signs.

Graduated doses were administered of from 1 gm. of test material/kg. of rat body weight, to 10 gm./kg. to two (2) rats at 1 gm. increments for each dose level. $LD_{50}$ (lethal doseage for 50% of the test population) were computed in accordance with a method of Litchfield and Wilcoron, Journal of Pharmacology and Experimental Therapeutics, volume 96, page 99, 1949. For a composition of leucocyanidin-catechin polymer, aminophosphonic acid component and zinc ion the $LD_{50}$ was 3 gm./kg. of rat body weight and for a composition according to this invention of Chelig 32, aminophosphonic acid component and zinc ions the $LD_{50}$ was 4.6 gms./kg. All parts by weight were the same such that the substitution was only of the polymeric constituent. The $LD_{50}$'s for compositions based upon LS350 as the polymer were substantially similar. These higher tolerances indicate a lower toxicity for the products of this invention than for those containing the leuocyanadin-catechin polymer. For such chemicals as sodium chloride (table salt) the $LD_{50}$ is 2.6 gms./kg. and for 10% (ten percent) acetic acid (household vinegar) the $LD_{50}$ is 3.53 gms./kg.

In order to determine the efficacy of our inhibitors in coolant systems, to reduce scale formation, tests were conducted in an apparatus designed to simulate the conditions found in such a system. The tests were conducted in the single tube heat exchanger apparatus described by E. A. Savinelli and O. Nowakowski in "Laboratory Corrosion Studies using a Single Tube Heat Exchanger" presented at the twenty-first (21st) annual conference of the National Association of Corrosion Engineering on Mar. 17, 1965, at St. Louis, Mo., and published in Indus- 1.5 p.p.m. of iron and, as calcium carbonate equivalents, 900 p.p.m. of calcium, 300 p.p.m. of magnesium, 60 p.p.m. of M. O. alkalinity, and 4938 p.p.m. of total dissolved solids.

Sodium chromate is recognized in the art as an efficient corrosion inhibitor, but which has low scale deposition prevention properties.

A representative composition of this invention was added to a standard hard water #II coolant system in the amount of 150 p.p.m. of coolant and the scale deposition was measured.

Sodium chromate was added to a standard water #II system in a similar amount, and the amount of scale was measured. These results were so poor, that a new system was analyzed that contained 500 p.p.m. of sodium chromate, present as $—CrO_4=$.

The weight of the film of scale deposited on the coupons immersed in the coolant for four (4) days was measured. The results are as follows:

| | Film weight (gms.) | | |
|---|---|---|---|
| | No additive | 150 p.p.m. of formulation of #1 of Example I | 500 p.p.m. as $CrO_4$ from Sodium chromate |
| Coupon No.: | | | |
| 1 | .2447 | .1036 | .1799 |
| 2 | .2412 | .1495 | .1879 |
| 3 | .2534 | .1709 | .2100 |
| 4 | .2428 | .1463 | .2247 |
| 5 | .2394 | .1498 | .2340 |
| Average | .2443 | .1440 | .2073 |

Note.—The reduction in scale is about 30.4% over sodium chromate's scale inhibition activity, for the composition of this invention. Other representative formulations of this invention are seen to give similar scale deposit inhibition.

It is seen that the compositions of this invention can be utilized in open and closed systems in the same manner.

It is readily seen that the compositions and processes of this invention can be applied not only to industrial applications, but also for application in the marine industry, for example, cooling systems which would be found in factories would be treated in a manner similar to cooling systems found in a vessel.

Since certain changes may be made in the above products and processes without departing from the scope of the invention herein involved, it is intended that all matter contained in the above description shall be interpreted as illustrative and not in a limiting sense.

What is claimed is:

1. A composition for inhibiting corrosion and scale deposition comprising:
    (a) at least one water-soluble metal salt containing a divalent metal ion selected from the group consisting of zinc, cadmium and mixtures thereof;
    (b) at least one member selected from the group consisting of the sodium, potassium and ammonium lingo-sulfonate-mixed sugar aldonates and the free acid derivative thereof, and (c) at least one chelating agent.

2. The composition of claim 1 wherein (c) is selected from the group consisting of sugar acids, polycarboxylic acid chelants and the alkylphosphonic acid chelants.

3. The composition of claim 2 wherein (c) is selected from the group consisting of sodium heptagluconate, ethylene diamine tetraacetic acid, the sodium salt of amino tri-(methylphosphonic) acid, amini tri-(methylphosphonic) acid, and nitrilotriacetic acid.

4. The composition of claim 1 wherein the (b) is selected from the group consisting of the products known as Chelig 32 and LS 350.

5. The composition of claim 1 wherein as an additional ingredient there is present a corrosion inhibitor specifically intended to inhibit corrosion in copper.

6. The compostion of claim 1 wherein the additional ingredient is selected from the group consisting of diethyldithiocarbamate, mercaptobenzothiazole, and benzothiazole.

7. The composition of claim 1 wherein:
  (a) is present in an amount to provide from 1% to about 10% divalent metal ion,
  (b) is present in an amount from about 15% to about 90%; and
  (c) is present in an amount from about 0.5% to about 25% all by weight.

8. A composition for inhibiting corrosion and the deposition of scale in a coolant system, which comprises:

|  | Percent |
|---|---|
| Ethylene diamine tetraacetic acid 4Na | 2.50 |
| Zinc chloride | 12.00 |
| Chelig 32 | 20.00 |
| Water | 65.50 |
|  | 100.00 |

9. A composition for the inhibition of corrosion and scale deposition in an aqueous coolant system which comprises:

|  | Percent |
|---|---|
| $ZnSO_4 \cdot H_2O$ | 35 |
| Chelig 32 | 60 |
| E.D.T.A. | 5 |
|  | 100 |

10. A composition for inhibiting corrosion and the deposition of scale which comprises:
  (a) from about 1% to about 10% divalent metal ion,
  (b) from about .5% to about 25% of a chelant, and
  (c) from about 15% to about 90% of at least one member selected from the group consisting of the sodium, potassium and ammonium ligno-sulfonate-mixed sugar aldonates and the free acid derivative thereof.

11. The composition of claim 10 wherein component (c) is the sodium ligno-sulfonate-mixed sugar aldonate.

12. A process for reducing the rate of corrosion and scale deposition of metal surface in contact with an aqueous coolant, which comprises contacting said metal surface with an aqueous coolant containing, in the range of about 2 to about 50 p.p.m. of a divalent metal ion selected from the group consisting of zinc, cadmium and mixtures thereof; in the range of from about 0.5 to about 100 p.p.m. of at least one member selected from the group consisting of the sodium, potassium and ammonium ligno-sulfonate mixed sugar aldonates, and the free acid derivative thereof and in the range of from 0.1 to about 25 p.p.m. of a chelating agent.

13. The process of claim 12 wherein the metal surface contains copper and said coolant contains in the range of from about 0.1 to about 10 p.p.m. of a copper corrosion inhibitor.

14. A process for inhibiting the rate of corrosion and scale deposition from an aqueous coolant which comprises adding to said coolant at least one-water soluble metal salt containing a divalent metal ion selected from the group consisting of zinc, cadmium, and mixtures thereof; the sodium ligno-sulfonate-mixed sugar aldonate, and at least one chelant selected from the group consisting of the alkylphosphonic acids, and the alkali salts thereof, the sugar acid chelants and the polycarboxylic acid chelants.

References Cited

UNITED STATES PATENTS

| 3,256,203 | 6/1966 | Robertson | 252—178 |
| 3,188,289 | 6/1965 | Kahler | 210—58 |
| 2,098,431 | 11/1937 | Partridge | 252—178 |
| 2,936,289 | 5/1960 | Harshman | 252—178 X |
| 3,099,521 | 7/1963 | Arensberg | 252—175 X |
| 3,234,124 | 2/1966 | Irani | 252—175 X |
| 3,303,139 | 2/1967 | Blaser | 252—175 X |
| 3,331,773 | 7/1967 | Gunderson | 210—58 |
| 3,412,180 | 11/1968 | Gorley | 252—175 X |
| 3,532,639 | 10/1970 | Hatch | 252—389 |

ROBERT F. BURNETT, Primary Examiner

M. E. McCAMISH, Assistant Examiner

U.S. Cl. X.R.

21—2, 7; 134—2, 3, 41; 210—58; 252— 81, 86, 87, 178, 181